June 4, 1963 P. L. BRINK ETAL 3,091,993
DIVE-TOSS AIR-TO-GROUND DELIVERY SYSTEM
Filed July 3, 1957 2 Sheets-Sheet 1

INVENTORS
CLARE D. McGILLEM
PAUL L. BRINK
CHARLES E. GRAVES
BY
ATTORNEYS

United States Patent Office 3,091,993
Patented June 4, 1963

3,091,993
DIVE-TOSS AIR-TO-GROUND DELIVERY SYSTEM
Paul L. Brink and Charles E. Graves, Indianapolis, Ind., and Clare D. McGillem, Flint, Mich., assignors to the United States of America as represented by the Secretary of the Navy
Filed July 3, 1957, Ser. No. 669,904
18 Claims. (Cl. 89—1.5)
(Granted under Title 35, U.S. Code (1952), sec. 266)

The invention described herein may be manufactured and used by or for the Government of the United States of America for governmental purposes without the payment of any royalties thereon or therefor.

This invention pertains to an airborne dive-toss system for use in "tossing" one or more objects such as bombs or other armament to a distant target. The "toss" effect, imparted to an object by releasing it while pulling up from a dive toward the target, increases the horizontal range at which release can be accomplished. This feature together with the fact that the pull-up may constitute the first portion of an evasive maneuver enhances greatly the safety of the aircraft.

In general, the dive-toss system of this invention makes it possible to dive along a path intersecting the target, begin a pull-up maneuver at a range from the target depending upon, among other things, the aircraft velocity and dive angle, and then release the object during the pull-up maneuver at a predetermined angle with respect to a horizontal plane. It is the release during pull-up which launches the object in a "toss" trajectory toward the target. The system itself comprises means such as a range radar to measure slant range during the dive toward the target, means such as a vertical gyro to measure the dive angle, a computer responsive both to the measured slant range and to the error between the measured dive angle and a preselected dive angle to generate a pull-up signal at the proper slant range, means responsive to the pull-up signal for indicating perceptibly the instant of arrival at the point where the pull-up maneuver should be initiated, means for indicating departures from a predetermined pull-up path, and means responsive to the angle-measuring means for releasing the object to be delivered at a predetermined release angle.

The development of "special weapon devices" capable of producing explosive effects of extended range has increased greatly the hazard normally incident to the delivery of weapons by conventional dive-bombing tactics. The steep dive angles used during such deliveries must be initiated at a comparatively high altitude, thereby exposing the aircraft to destruction by enemy ground-to-air defenses such as rockets, guided missiles, and anti-aircraft guns. Furthermore, the fact that it may be desirable, for tactical reasons, to detonate a special weapon device at a considerable altitude above the ground increases greatly the likelihood that the delivery aircraft may be destroyed by the resulting blast. It should be obvious, therefore, that improved anti-aircraft defense systems and armament of vastly-increased blast range reduce markedly the probability that the delivery aircraft will survive a conventional dive-type delivery of such a device.

The delivery of special weapon devices by dropping them from an aircraft during a level run over the target also is unsuitable for use in many tactical situations. Such deliveries ordinarily must be made from very high altitudes, both to minimize the dangers from enemy ground defenses and to provide sufficient time for the delivery aircraft to move out of the blast area before the detonation occurs. Moreover, the fact that the typical tactical target is small and not easily detectable from high altitudes is another of many reasons why the level-approach delivery is impractical.

It is well known that the aforedescribed hazards incident to tactical deliveries of special weapon devices by conventional procedures may be mitigated by making a low-altitude, high-speed approach and releasing the weapon downrange from the target while executing the pull-up portion of an evasive maneuver which, for example, may be a half cuban eight. The low altitude, high-speed aproach run provides maximum immunity from enemy ground-to-air defenses and the release downrange from the target provides enough time for the aircraft to turn away from the blast zone. The release of the weapon during pull-up "tosses" it over the remaining distance to the target. This delivery tactic is called loft bombing because the trajectory along which the weapon travels after release has an initial ascending portion which rises to an altitude above that of the release point before beginning its downward arc to the target. Therefore, the term loft as used herein, will means a toss bombing tactic characterized by a trajector which rises above a horizontal plane through the release point. The term toss will be used generically to represent any delivery tactic characterized by the existence, at the instant of release, of a component of force attributable to curvilinear acceleration of the delivery aircraft. Hence, a loft bombing tactic may be a species of toss tactic. The term dive-toss is intended to represent a delivery tactic characterized by a toss release executed at any point during pull-up from a dive toward the target; the trajectory of the object in traveling to the target may or may not have a loft portion.

Heretofore, the problem of executing a successful low-altitude, high-speed, toss delivery has been resolved by pre-selecting and precalculating the conditions requisite therefor prior to the time the mission is undertaken and then, with the aid of an appropriate system of instrumentation, flying the aircraft in accordance with these conditions. A principal method of executing such deliveries in the past has involved the use of a loft tactic wherein the delivery aircraft proceeds to a position above a pre-selected initial point (hereinafter abbreviated IP), such as a landmark located a known distance from the target, continues on a course toward the target at a preselected low altitude and a prespecified constant velocity for the time interval precalculated to place the delivery aircraft at a predetermined distance downrange from the target at the moment pull-up is to begin, executes a pull-up along a prespecified path, and finally releases the object to be delivered at a predetermined positive angle with respect to a horizontal plane. If each of the foregoing steps has been carried out precisely in accordance with the delivery plan, the object will be "tossed" along a loft trajectory to the target.

The equipment for flying a delivery aircraft in accordance with an IP-loft delivery plan includes an intervalometer for measuring the time interval from the instant the IP is passed to the instant the pull-up maneuver is to begin, an accelerometer for indicating the force of curvilinear acceleration during pull-up so that the maintenance of a prespecified accelerative force will insure a pull-up path of predetermined radius, a first gyroscopic unit to indicate deviations from the pull-up path along the yaw and roll axes, and a second gyroscopic unit for effecting the release of the object at the predetermined release angle.

One of the most important requisites for a successful execution of the IP-loft delivery tactics is to place the delivery aircraft at the altitude and slant range from the target which, in accordance with the precalculated solution, locates the pull-up point with respect to the target. The reason for using an IP is to assist in fulfilling this requirement. Thus, where the aircraft is flown for the precalculated time at the prespecified constant velocity and altitude from a position directly above the IP, the aircraft will have arrived at the precalculated pull-up point at the end of the timing interval. It should be apparent, therefore, that one of the basic propositions upon which the IP-loft tactic is predicated is that the position of an aircraft over an IP can be estimated more accurately than an instantaneous slant range.

Although the IP-loft delivery tactic is superior to conventional dive and level-run deliveries in many situations, the use of an IP is, nonetheless, the source of many serious disadvantages which, as will become more apparent hereinafter, are avoided by the dive-toss system of this invention. For example, the necessity of orienting the delivery with reference to a fixed IP may preclude the use of the tactic altogether in situations where an IP does not exist or where the exact distance between the IP and the target cannot be determined in advance because accurate maps of the region surrounding the target are unavailable. Furthermore, in a situation where only a single IP exists, the delivery may be thwarted because, for example, the direction of approach to the target requires a hazardous flight over enemy territory, or enemy aircraft defenses have been concentrated around it. The IP-loft delivery tactic also is subject to other disadvantages attributable primarily to inadequacies of the equipment provided to facilitate its execution. For example, with existing apparatus it is difficult to estimate when the aircraft is located precisely above the IP and to actuate the intervalometer at that instant, a difficulty which may be compounded by poor visibility or an IP of large or indefinite dimensions.

Generally, the dive-toss system disclosed herein is intended to provide apparatus for executing a low-altitude, high-speed "toss" delivery in accordance with preselected and precalculated conditions but without the above-mentioned disadvantages attributable to a fixed IP. Freedom from the limitations of an IP is achieved by providing, in the system of this invention, means which may include a range radar for measuring continually the true, or slant, range to the target and a computer for producing a signal to signify arrival at the slant range where pull-up should be initiated.

A solution of the problem of "tossing" an object to a target by releasing it during pull-up from a dive involves consideration of the dive angle, pull-up path, instantaneous angle and velocity at release, slant range at the instant pull-up is initiated, and ballistic characteristics of the object to be delivered. Inasmuch as the respective values of these parameters may be preselected and precalculated to provide a variety of solutions of the dive-toss delivery problem, it is conceivable that an aircraft may proceed in accordance with any one of these solutions to "toss" the object to the target. Experiment has indicated, however, that it is virtually impossible to monitor both the dive angle and the aircraft velocity during the dive portion of the delivery with sufficient accuracy to produce acceptable results. Accordingly, the dive-toss system of this invention includes a computer which continuously compensates the measured slant range to offset the effect of deviation from the preselected dive angle. As a result, only the aircraft velocity must be monitored closely.

In accordance with a dive-toss delivery tactic executed with the aid of this invention, the aircraft dives at a prespecified velocity along a line intersecting the target and forming, with respect to a horizontal plane, an angle, preferably shallow, which may vary in magnitude within predetermined limits of error around a preselected value of dive angle. The dive continues until the measured slant range to the target is reduced to a computed value of pull-up slant range. At this point pull-up is begun and continues until, at a predetermined instantaneous angle between the flight path of the aircraft and a horizontal plane, the object is released. It should be noticed that a delivery in accordance with this tactic does not depend upon the use of an IP. Moreover, it is unnecessary to monitor the dive angle closely during the dive; it will be sufficient if the angle is maintained within the limits prescribed by the delivery conditions.

A preferred embodiment of the dive-toss air-to-ground delivery system of this invention may comprise: means such as an air-to-ground radar continually measuring and producing a quantity representing the slant range to target; means such as a vertical gyroscopic unit continuously measuring and producing a quantity representative of the instantaneous angle between the dive path of the aircraft and a horizontal plane; a pull-up range computer made up of means for generating a quantity of fixed magnitude representative of a precalculated slant range at which pull-up should begin, means generating a quantity of fixed magnitude representing a preselected dive angle, means such as a servo system responsive to the fixed and measured dive-angle quantities for producing a quantity representing the magnitude and direction of any instantaneous error between the measured dive angle and the preselected dive angle, means translating the instantaneous dive-angle error quantity into a slant-range error quantity, and means algebraically combining the slant-range error quantity with the measured slant range quantity to produce a modified quantity representative of slant range as if measured at the preselected dive angle, and means such as a pull-up signal generator responsive to the modified and precalculated slant range quantities to produce a pull-up signal when the latter quantity becomes substantially equal in magnitude to the former; means such as an aural tone or signal lamp actuated by the pull-up signal for signifying perceptibly the instant at which the pull-up maneuver should begin; means perceptibly registering flight path errors around the roll axis continuously and responsive to the pull-up signal to register selectively the dive-, or pitch-, attitude errors during the dive portion and yaw and acceleration errors during the pull-up portion of a dive-toss tactic; and means responsive to the measured dive-angle quantity for releasing the object to be delivered at a predetermined angle measured with respect to a horizontal plane.

The pull-up maneuver must follow a predetermined path so that the slant range at the release point will be that which, when combined with the proper values of velocity and release angle, will "toss" the object to the target. The instrumentation required to facilitate this portion of the dive-toss delivery tactic is well known in the art and may comprise, for example, an accelerometer for continuously indicating instantaneous accelerative force and a gyroscopic unit for indicating deviations from the predetermined pull-up path along the yaw and roll axes. The precalculated solutions of the dive-toss delivery tactic are predicated upon the assumption that a curvilinear accelerative force will be developed during the pull-up maneuver. Thus, it is possible to proceed along the predetermined pull-up path without pitch deviations therefrom merely by flying the aircraft in a manner which will produce a prespecified accelerative force indication. The yaw-roll gyroscopic unit makes it possible to maintain the pull-up path in the vertical plane passing through the longitudinal axis of the aircraft at the instant pull-up begins.

The velocity of the delivery aircraft at the release point is another important prerequisite for producing the "toss" needed to carry the object across the remaining distance to the target. In both the IP-loft and the dive-toss tactics it has been found that the essential release velocity can be approximated with sufficient accuracy merely by entering the pull-up maneuver at a prespecified velocity. As set forth above, the identification of the release point and automatic release of the object occur when the output quantity from a vertical gyroscopic unit represents the existence of a predetermined release angle measured, for example, between a horizontal plane and a line related to the instantaneous direction of the flight path of the delivery aircraft.

From the foregoing comparison of the conventional IP-loft tactic and system with the dive-toss tactic and system disclosed herein, it should be apparent that the objects of this invention are:

(1) To provide a dive-toss air-to-ground delivery system to facilitate the execution of toss-type deliveries of objects to a target.

(2) To provide a dive-toss air-to-ground delivery system to facilitate a low-altitude, high-speed, toss-type delivery of an object to a target.

(3) To provide a dive-toss air-to-ground delivery system to facilitate the tossing of an object to a target without the use of an initial point (IP), thereby obviating the aforementioned limitations and disadvantages of known systems and making it possible to execute a prechosen delivery program from any radial direction relative to the target.

(4) To provide a dive-toss air-to-ground delivery system for use against tactical targets situated to unmapped or inaccurately mapped regions.

(5) To provide a dive-toss air-to-ground delivery system including an air-to-ground radar system for continually measuring the true, or slant, range between the delivery aircraft and the target.

(6) To provide a dive-toss air-to-ground delivery system wherein the true, or slant, range to the target is measured continually by an air-to-ground radar system and a signal for beginning the toss maneuver is developed at a computed slant range from the said target.

(7) To provide a dive-toss air-to-ground delivery system to facilitate tossing an object to a target in accordance with a preselected and precalculated toss-type delivery program.

(8) To provide a dive-toss air-to-ground delivery system to facilitate the execution of a low altitude, high velocity delivery plan which minimizes the risk of damage or destruction of the delivery aircraft from bomb blast and enemy anti-aircraft defenses.

(9) To provide a dive-toss delivery system to facilitate the execution of a programmed flight maneuver whereby an object is tossed to a target by diving toward it at a constant velocity, continually measuring the instantaneous slant range to the target, beginning a pull-up maneuver along a prespecified path at a computed slant range, and releasing the object at a predetermined angle with respect to a horizontal plane.

(10) To provide means for effecting an air-to-ground delivery of an object in accordance with a prechosen divetoss delivery program whereby the delivery aircraft dives toward a target at a constant velocity, a pull-up slant range computer responsive to instantaneous slant-range and dive-angle inputs produces a signal for indicating perceptibly the instant when a pull-up maneuver should begin, pull-up is executed along a prespecified path, and the object to be delivered is released when the aircraft reaches a predetermined angle with respect to a horizontal plane.

(11) To provide a system for effecting an air-to-ground delivery of an object in accordance with a prechosen divetoss delivery program, the said system including a computer responsive to input quantities representative of instantaneous slant range and dive angle and internally-generated quantities representative of precalculated dive angle and slant range to produce an output quantity signifying the instant when the pull-up maneuver should commence.

(12) To provide a system of superior economy, reliability, and engineering simplicity for effectuating any of the aforesaid objects.

The foregoing summary of the invention, discussion of the problem evoking its origination, and statement of its objects are intended merely to facilitate the development of an understanding and appreciation of its principal features, not to restrict its scope. It is probable that aditional objects and features of the invention will become apparent after reference to the following detailed description made in conjunction with the accompanying drawings wherein:

Figure 2:
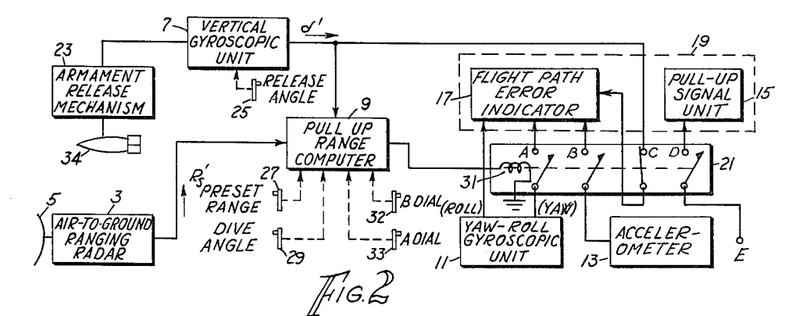
FIG. 2 is a block diagram of the essential components comprising a dive-toss air-to-ground delivery system in accordance with this invention.

*Description of the Dive-Toss System of FIG. 2*

Figure 1:
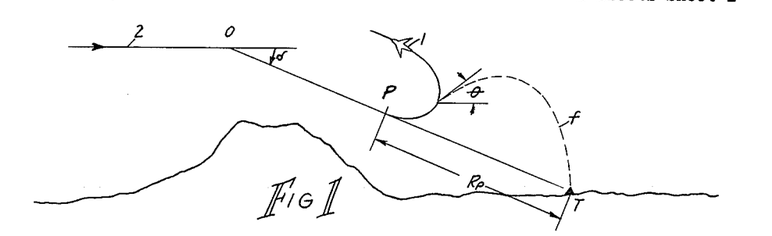
FIG. 1 represents diagrammatically a dive-toss delivery tactic executed with the aid of this invention.

A dive-toss delivery tactic executed with the aid of this invention is represented diagrammatically in FIG. 1. The delivery aircraft 1 may approach the area of the target from the left along a horizontal flight path 2. At point O the aircraft begins diving at dive angle $\delta$ along a flight path OP. Upon arrival at point P, located at the pull-up slant range $R_p$ from target T, the aircraft begins a pull-up maneuver along a prespecified path. At release point L, identified by the existence of a preselected release angle $\theta$, the object to be delivered is released and travels along the toss trajectory $f$ to the target T. Following release, the delivery aircraft 1 is free to pursue any appropriate evasive maneuver. Although the dive portion OP of the flight path 2 is represented as a straight line, it should be understood that a principal feature of the dive-toss system of this invention, to be explained more fully hereinafter, permits departures, within limits, from the dive angle $\delta$, thereby resulting in corresponding nonlinear variations in the pull-up range $R_p$.

A successful execution of the aforedescribed dive-toss delivery tactic requires that the procedure conform to a function represented by $$R_s = f(\delta, \theta, V_L, B_o)$$

wherein $R_s$ represents instantaneous slant range, $\delta$ represents dive angle, $\theta$ represents release angle, $V_L$ represents velocity of the delivery aircraft at the release point L, and $B_o$ is a factor representing the ballistic characteristics of the object to be delivered. This function can be satisfied by innumerable sets of parameter values. Each set of values establishes a corresponding configuration of the dive-toss tactic represented generally in FIG. 1. For example, the dive angle $\delta$ may vary from steep angles approaching $-90°$ to very shallow angles of $-5°$, or less. Likewise, the release angle $\theta$ also may be varied from a very steep angle approaching 90° through 0° to a negative angle not exceeding the value of the dive angle $\delta$. Thus, by precalculating sets of parameters which will satisfy the abovementioned function, it becomes possible to choose beforehand a configuration which will be most appropriate for the anticipated conditions of a delivery mission.

The dive-toss air-to-ground delivery system of this invention, represented in FIG. 2, facilitates the execution of a dive-toss delivery tactic in accordance with a prechosen set of parameter values. A preferred embodiment of the system is comprised of an air-to-ground ranging radar 3 including a directional antenna 5 for continually measuring and producing a quantity $R_s'$ representative of the true, or slant, range between the delivery aircraft and the target; a vertical gyroscopic unit 7 for measuring and producing a quantity $\delta'$ continuously representative of the dive, or pitch, angle of the delivery aircraft; a pull-up range computer 9 responsive to $R_s'$ and $\delta$ to compute and produce a signal at the instant the delivery aircraft 1 arrives at point P of FIG. 1 where the prespecified pull-up maneuver is to begin; a yaw-roll gyroscopic unit 11 for producing quantities representative of the magnitude and direction of any deviations from the flight path along the yaw and roll axes, respectively; an accelerometer 13 for producing a quantity representative of the magnitude and direction of any departure in pitch from the predetermined pull-up path; a pull-up signal unit 15 and a flight path indicator 17, mounted within the pilot's compartment 19 of the delivery aircraft, for producing, respectively, a perceptible indication at the time of arrival at pull-up point P and a perceptible indication of the magnitude and direction of any deviation from the predetermined flight path during the dive and pull-up portions of the delivery tactic; a relay unit 21 actuated by the pull-up signal output of the range computer 9 and having normally-open contacts A, B, and D, and normally-losed contact C for selectively connecting a power source E, the yaw output quantity of the yaw-roll gyroscopic unit 11, and the output of accelerometer 13 to the pull-up signal unit 15 and the flight path indicator 17; an object 34 to be delivered; and an armament release mechanism 23 for releasing the object 34 upon arrival at release point L identified, of course, when the magnitude of $\delta'$ becomes equal to the preselected release angle $\theta$. A control 25 is provided for setting the preselected value of release angle $\theta$ into the vertical gyroscopic unit 7. Likewise, controls 27 and 29 are provided for setting a precalculated value of pull-up slant range $R_p$ and a preselected value of dive angle $\delta$, respectively, into the pull-up range computer 9.

Hereinafter, symbols having a single prime, such as $R_s'$ and $\delta'$, will represent measured quantities. Symbols having a double prime, such as $R_p''$ and $\delta''$, will represent precalculated, internally-generated quantities; and symbols having a triple prime will represent computed, corrected, or compensated quantities. Unprimed symbols will represent geometric parameters.

Although the ranging radar 3 is conventional, it is preferably of a monopulse type, capable of accurately measuring the range to a reflecting surface inclined at an oblique angle to the centroid of antenna 5. This feature makes it possible to produce sufficiently accurate values of $R_s'$, for example, at dive angles as shallow as $-5°$. The directional antenna 5 of radar 3 is mounted on the delivery aircraft 1 in a fixed position such that its centroid will coincide substantially with the dive path. Although variations in the dive angle and velocity of the aircraft are sources of error which tend to lengthen or shorten the range at which pull-up should begin, these errors can be minimized during the dive by compensating for dive, or pitch, angle variations automatically and monitoring velocity closely.

The vertical gyroscopic unit 7 includes a high-speed rotor mounted in a universal gimbal to provide the vertical reference element around which deviations of the delivery aircraft relative to the roll and pitch axes may be measured and transduced, by potentiometers, for example, into representative electrical quantities. A movable sector switch may be calibrated and coupled to the gyro pitch axis for completing an energizing circuit to the armament release mechanism 23 at the instant the pull-up attitude of the delivery aircraft reaches the preset release angle $\theta$. Inasmuch as universally-gimballed vertical gyros having pick-off potentiometers and sector switches are entirely conventional and well known to practitioners in the art, they are not shown in FIG. 2.

The armament release mechanism 23 may be comprised of any conventional object release apparatus. For example, the mechanism may comprise explosive bolts which affix the object to the wings or fuselage of the delivery aircraft.

The pull-up range computer 9, responsive to the $\delta'$ output of the vertical gyroscopic unit 7 continuously adjusts the magnitude of $R_s'$ from radar 3 to compensate for the effect of variations in the dive angle $\delta$ around the preselected value set in via control 29. Furthermore, the pull-up range computer 9 produces a pull-up signal output when the magnitude of the compensated slant range quantity becomes equal to the preselected pull-up slant range set in via preset range control 27. The B dial 32 and A dial 33 make it possible to calibrate the computer 9 for use with aircraft having different flight characteristics. The structure and operation of computer 9 will be set forth in considerable detail hereinafter.

The pull-up signal unit 15 and the flight path indicator 17, located in the pilot's compartment 19, and the yaw-roll gyroscopic unit 11 and the accelerometer 13 make it possible to fly the delivery aircraft 1 along the path predetermined by the parameters of the prechosen dive-toss tactic. It is inferable from FIG. 1 that the pull-up path PL, toss trajectory $f$, and target T lie in a common vertical plane and that any departure of the flight path from this plane during the pull-up maneuver will produce an error causing the object to miss the target. Therefore, during pull-up, displacements around the rotor (not shown) of the yaw-roll gyroscopic unit 11 are transduced into a perceptible indication of the magnitude and direction of any departures from the aforesaid vertical plane at flight path indicator 17. Likewise, displacements of a seismic mass (not shown) in accelerometer 13 are transduced, in the flight path indicator 17, into a perceptible indication of the magnitude of the radial component of curvilinear acceleration during pull-up. It is the indication of curvilinear acceleration which makes it possible to detect and correct for pitch deviations from the pull-up flight path.

The pull-up signal unit 15 may comprise any device for transducing an electrical quantity into a perceptible quantity such as light or sound. Hence, this unit may be comprised of an electrical lamp or a buzzer, ear phones, or any other such device.

The flight path indicator 17 may comprise means such as a dial-type device having a vertical pointer for registering, on a horizontal scale, roll deviations during the dive portion OP, and composite yaw-roll deviations during the pull-up portion PL of the delivery tactic; and a horizontal pointer for registering on a vertical scale deviations in dive, or pitch, angle during the dive portion OP and the existence or nonexistence of the prespecified accelerative force during the pull-up portion PL of the tactic. The flight path indicator 17 also includes a resistance bridge for combining the roll and yaw outputs of the yaw-roll gyroscopic unit 11 to produce a resultant composite yaw-roll signal. Such a bridge may consist of various fixed resistors and potentiometers for balancing the yaw and roll signals and for adjusting the ratio between yaw and roll. Inasmuch as apparatus for transducing quantities representative of yaw, roll, and accelerative force into pointer deflections are conventional, details thereof have not been shown in FIG. 2.

The yaw-roll gyroscopic unit 11 comprises a high-speed rotor mounted in universal gimbals to provide a horizontal reference element making possible the measurement of deviations around the yaw and roll axes. Two potentiometers affixed to the yaw and roll axes, respectively, transduce any displacement relative to the reference element into corresponding yaw and roll quantities. The yaw-roll gyroscopic unit 11 also is conventional and well-known in the art and, as such, need not be described in further detail or illustrated by more than the block representative thereof in FIG. 2.

The accelerometer 13 may comprise any well-known device operative to produce an electrical output in response to an accelerative force. For example, the seismic mass of the accelerometer may consist of a potentiometer bobbin and winding mounted on ball bearings for linear movement along a vertical guide shaft. Accelerative forces cause the mass to move up and down on the guide shaft, thereby producing an electrical output of corresponding magnitude from the potentiometer. The seismic mass may be resiliently suspended and damped, for example, by immersion in a fluid of appropriate viscosity. Inasmuch as such accelerometers are well-known, the structure thereof is not represented in the drawings.

The relay unit 21 may comprise any relay unit having three normally-open and one normally-closed contacts operable in unison in response to an electrical signal. A holding relay (not shown) may be associated with relay unit 21 to maintain the coil 31 in an energized condition throughout the pull-up portion of the tactic.

*Operation of the Dive-Toss System of FIG. 2*

The operation of the aforedescribed system in executing a typical dive-toss delivery tactic will be explained with reference to FIG. 1 and FIG. 2. Before a delivery mission is undertaken, a release angle $\theta$ and dive angle $\delta$ are selected, and the pull-up slant range $R_p$, determined by the selected values of the $\theta$ and $\delta$, is computed or, as may be the case in practice, found by reference to precalculated tables or curves. The preselected values of $\theta$, and $\delta$ and the computed pull-up slant range $R_p$ are then set into the vertical gyroscopic unit 7 and the pull-up range computer 9, respectively. As the delivery aircraft approaches the area of the target along the horizontal portion of the flight path 2 of FIG. 1, the first problem is to estimate the time of arrival at the pushover point O where the dive toward the target at the precalculated dive angle $\delta$ should begin. Inasmuch as arrival at point O must be estimated, it is to be expected that the delivery aircraft may begin the dive before, at, or after overshooting point O. The precise point at which the dive is initiated is not too critical and may vary within wide limits.

After the delivery aircraft enters the dive, the next problem is to raise or lower the flight path until the dive angle $\delta'$, as registered, for example, on a horizontal pointer (not shown) incorporated in the flight path indicator 17, approximates the preselected value $\delta$ set into the pull-up range computer 9. The delivery aircraft may be guided onto the correct flight path by sighting on the target through a conventional optical sight (not shown) while raising or lowering the path to achieve the required dive angle. It should be apparent, therefore, that the portion of the flight path immediately following the pushover point O may depart considerably from the straight line shown in FIG. 1.

After the delivery aircraft is brought onto flight path OP in the manner described above, the radar 3 will be measuring true, or slant, range $R_s'$ to the target T. Thereafter it will not be necessary to monitor closely the dive angle indication because the pull-up range computer 9 will adjust the magnitude of $R_s'$, in a manner to be explained more fully hereinafter, to compensate for departures from the preselected dive, or pitch, angle. However, aircraft velocity must be monitored closely to insure that its prespecified value exists at the instant the pull-up point P is reached. This may be done, for example, by observing a conventional air-speed indicator (not shown).

During the dive the yaw-roll gyroscopic unit 11 is generating a roll-representative output quantity which is supplied to the flight path indicator 17 where it may be utilized, for example, to deflect a vertical pointer (not shown), thereby registering perceptibly any rotation of the aircraft around the roll axis.

Throughout the dive portion OP of the tactic, the pull-up range computer 9 is continuously compensating the $R_s'$ output of radar 3 for deviations from the preselected value of dive angle. When the delivery aircraft arrives at point P, the pull-up range computer 9 produces a pull-up signal which energizes the coil 31 of relay unit 21, thereby closing contacts A, B, and D, and opening contact C. This couples the yaw-representative output of the yaw-roll gyroscopic unit 11 and the accelerative-force representative output of the accelerometer 13 to flight path indicator 17 through contacts A and B, couples power source E to pull-up signal unit 15 through contact D, and interrupts the path of $\delta'$ between the vertical gyroscopic unit 7 and flight path indicator 17 at contact C. Thus, the operation of relay unit 21 in response to the pull-up signal energizes the pull-up signal unit 15 from power source E to produce a perceptible indication of arrival at pull-up point P and, at the same time, changes the indication of flight path indicator 17 from one representing dive angle and roll to one representing yaw-roll and acceleration.

At the instant pull-up signal unit 15 is energized, the pull-up portion PL of the delivery tactic is begun. During pull-up it is necessary to monitor closely the respective indications of accelerative force and yaw-roll presented by the pointers (not shown) of flight path indicator 17 in order to detect and correct for any deviations from the predetermined pull-up path. Upon arrival at point L where the angle of inclination of the aircraft is equal to the release angle $\theta$, the armament release mechanism 23 is actuated automatically through the vertical gyroscopic unit 7, thereby launching the object to be delivered into toss trajectory $f$.

Figure 3:
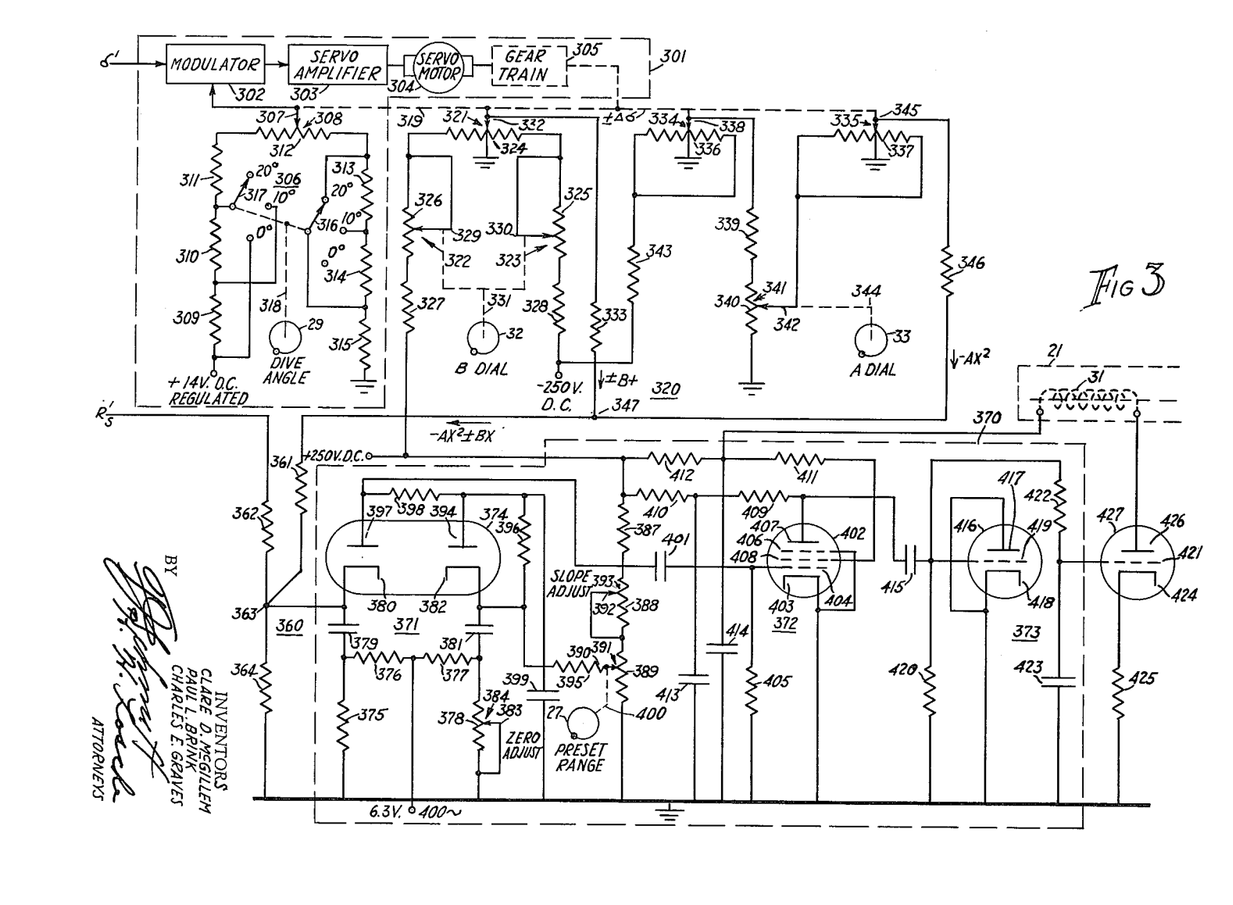
FIG. 3 is a schematic-block diagram representing the dive-toss air-to-ground system of this invention.

*Physical Description of the Pull-Up Range Computer, Fig. 3*

The pull-up range computer 9 of FIG. 2 is represented in greater detail in the block-schematic diagram of FIG. 3. As explained hereinbefore, the basic function of the computer is to compensate the $R_s'$ output of radar 3 for departures in instantaneous pitch attitude of the delivery aircraft from the preselected dive angle $\delta$ preset into the computer via dive angle control 29, and to develop a pull-up signal when the compensated slant range quantity $R_s'''$ becomes equal in magnitude to the precalculated pull-up slant range $R_p$ preset into the computer via preset range control 27.

Generally, the pull-up range computer 9 effects this result by transducing the $\delta'$ output of the vertical gyroscopic unit 7 into a mechanical error quantity $\pm \Delta \delta$ representative of the magnitude and direction of any departure, in pitch, from the preselected preset dive angle $\delta$, translating the error quantity $\pm \Delta \delta$ into a corresponding slant range error signal $\pm \Delta R_s$, combining the slant range error signal with $R_s'$, and comparing the resultant compensated slant range quantity $R_s'''$ with a fixed-magnitude quantity $R_p''$ representing the precalculated pull-up slant range $R_p$ preset into the computer via preset range control 27, and developing a pull-up signal when the relative magnitudes of the last-named two quantities become substantially equal. In effect, therefore, the function of the computer is represented by the simple mathematical expression $$R_p''' = R_p'' \pm \Delta R_s$$

wherein $R_p'''$ represents computed pull-up slant range.

The pull-up range computer 9 comprises a closed-loop servo system 301, an error-translating network 320, a combining network 360, and a pull-up signal generating circuit 370.

The closed-loop servo system 301 is conventional and, for example, may be made up of a modulator 302, servo amplifier 303, servo motor 304, gear train 305, and a voltage divider network 306. The modulator 302 receives both the $\delta'$ output of the vertical gyroscopic unit 7 in the form of a direct-current potential and a direct-current potential from the potentiometer network 306 representing the position of the voltage pickoff arm 307 of potentiometer 308. The function of the modulator 302 is to compare the magnitude of the $\delta'$ potential with that from potentiometer 308 in order to develop a position error voltage having a magnitude and polarity representing the extent and direction by which the position of the potentiometer pickoff arm 307 differs from that represented by $\delta'$. The modulator 302 may be comprised of any one of a number of well-known conventional modulators which will perform the aforestated function. It may include, for example, a chopper for converting direct to alternating-current voltages.

A conventional servo amplifier 303 receives the position-error voltage output of the modulator 302 and increases its magnitude to the extent required for energizing the servo motor 304. The servo amplifier 303 may be comprised of any amplifier which will satisfy the design specifications of the servo loop. The servo motor 304 also is conventional and, for example, may be comprised of any motor operative in response to an error signal and reversible in response to a distinctive change in the characteristic of such signal; for example, a change in its phase or polarity.

The gear train 305 provides a conventional mechanical linkage between the output of servo motor 304 and the voltage pickoff arm 307 of potentiometer 308. The voltage divider network 306 provides a means for producing a potential $\delta''$ representative of the preselected dive angle $\delta$. This network comprises resistors 309, 310, and 311, potentiometer resistor 312, and resistors 313, 314, and 315 coupled in series in the order named between a source of regulated, +14 v., direct-current potential and a ground source of reference potential. Two multi-position switches have their respective throw arms 316 and 317 coupled mechanically to dive angle control 29 by a common shaft 318. Each of the switches has three contacts for establishing, respectively, $\delta''$ potentials at or near the center of potentiometer resistor 312 having magnitudes representative of preselected dive angles of 0°, 10°, or 20°. The 0°- and 10°-contacts of the first switch are coupled to the regulated, +14 v., source of direct-current potential and to the common terminal of resistors 309 and 310, respectively, and the 20°-contact is floating. The throw arm 317 of the first switch is coupled to a terminal common to resistors 310 and 311. The 10°- and 20°-contacts of the second switch are coupled to terminals common to resistors 313 and 314, and to resistor 313 and potentiometer resistor 312, respectively, and the 0°-contact is floating. The throw arm 316 of the second switch is coupled to a terminal common to resistors 314 and 315. Thus, a rotation of dive angle control 29 moves the switch throw arms 316 and 317 in tandem from one of the three dive angle values to another. A change in switch position has the effect of shunting one of the series-connected resistors on one side of potentiometer 308 and unshunting one of the series-connected resistors on the other side of the potentiometer 308. In this way, the potential across the potentiometer resistor 312 is changed to the extent required to render the direct-current potential $\delta''$ at or near its center representative of a preselected dive angle $\delta$, or 0°, 10°, or 20°.

It should be apparent, of course, that the voltage divider network 306 may be designed to have any desired number of switch positions representing corresponding values of dive angle without exceeding the scope of this invention. The 0°-position of dive-angle control 29 is included merely to assist in calibration. In this position the voltage pickoff arm 307 of potentiometer 308 is at its center, and null, point when the vertical element of the vertical gyroscopic unit 7 (FIG. 2) is caged, thereby producing a $\delta'$ output representing a 0°-dive, or pitch-, angle orientation. From the foregoing description, it is apparent that the closed-loop servo system 301 operates in response to variations in the magnitude of the dive, or pitch, angle quantity $\delta'$ to cause the voltage pickoff arm 307 of potentiometer 308 to move to a position where the potential on resistor 312 is equal to $\delta'$.

The magnitude and direction of the mechanical displacement of the voltage pickoff arm 307 from the position on resistor 312 where the potential $\delta''$ represents the preselected dive angle $\delta$ is proportional to the instantaneous deviation $\pm\Delta\delta$ of the delivery aircraft from the preselected pitch, or dive, angle preset into the computer via dive angle control 29. The mechanical linkage 319 couples the mechanical dive angle error quantity $\pm\Delta\delta$ to the curve fitting network 320 where it is translated into an output quantity representative of a corresponding error in slant range $\pm\Delta R_s$.

The curve fitting network 320 is comprised of two potentiometer circuits, a B dial circuit and an A dial circuit, having their respective outputs added algebraically at point 347. The curve fitting network 230 is designed to operate in accordance with an empirically-derived, error-translation equation having the form (1) $$Y = AX_2 \pm BX$$

wherein Y represents the slant-range error $\pm\Delta R_s$ in feet, X represents the dive angle error $\pm\Delta\delta$ in degrees, and A and B are constants. This equation defines a parabola passing through the origin of a rectangular coordinate system.

Figures 4, 5, 6:
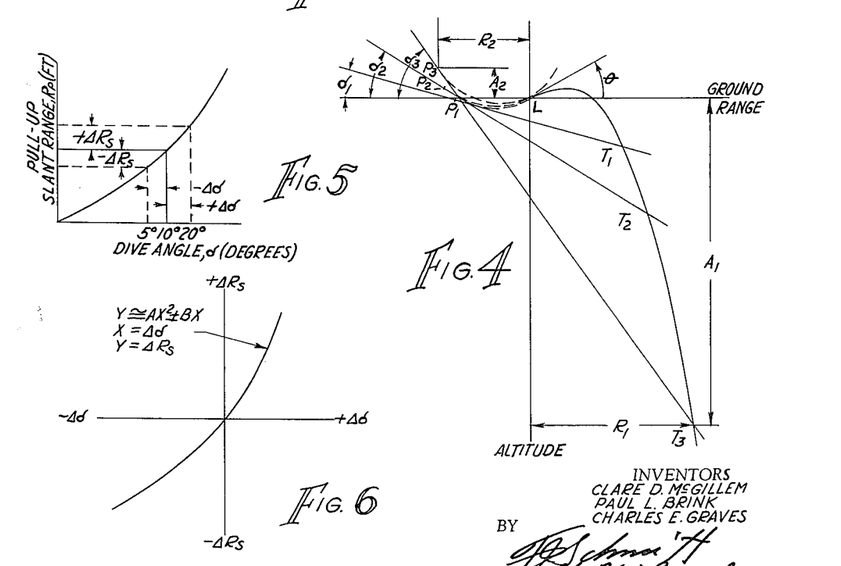
FIGS. 4, 5, and 6 are curves representing an empirical procedure through which the computer of this invention can be mechanized.

A graphical method based upon the use of empirical data for deriving the aforestated error-translation equation is set forth generally in the curves of FIGS. 4, 5, and 6. The curves of FIG. 4 illustrate a graphical technique for determining values of pull-up slant range $R_p$ (FIG. 1) for various values of dive angle $\delta$ under conditions where all other parameters of a delivery technique are fixed. The curve of FIG. 5 represents the variation of pull-up slant range $R_p$ with dive angle $\delta$ for the values taken from FIG. 4, and the curve of FIG. 6 represents the magnitude and direction of error in pull-up slant range $\pm\Delta R_s$ produced by corresponding errors in dive ange $\pm\Delta\delta$. It has been found that the curve of FIG. 6 may be approximately closely by the aforestated error-translation Equation (1).

The curve through points L, $T_1$, $T_2$, $T_3$ of FIG. 4 represents the air-to-ground trajectory for objects having substantially equal ballistic characteristics released at point L from a delivery aircraft moving at a velocity V and having an instantaneous release angle $\theta$ measured with respect to a horizontal plane. The shape of the trajectory curve is determined by the ballistic characteristics of the object, velocity V, the release point L, and the release angle $\theta$. The altitude and ground-range data defining a trajectory curve can be obtained through the use of well-known empirical techniques and then plotted on a rectangular coordinate system. Thus, in FIG. 4, for example, the release point L constitutes the origin of a rectangular coordinate system wherein ground range is measured with reference to the horizontal axis, and altitude is measured with reference to the vertical axis. The altitude and ground-range data obtained through the use of empirical methods may then be plotted on this coordinate system to form a trajectory curve such as curve L, $T_1$, $T_2$, $T_3$.

In accordance with the dive-toss delivery tactic described hereinbefore, the delivery aircraft arrives at release point L by performing a pull-up maneuver from a dive toward the target. Inasmuch as it is assumed that the release point L is fixed in space, it is apparent that the location of the point where the pull-up maneuver must begin will be determined by the angle preselected for the dive toward the target. The data defining coordinates for various points along pull-up paths initiated from various dive angles also can be determined by conventional empirical techniques. By plotting such data on the coordinate axes of FIG. 4, it is possible to locate graphically the point where pull-up should be initiated for each of the corresponding dive angles.

As set forth hereinbefore, the air-to-ground ranging radar 3 (FIG. 2) produces an output quantity $R_s'$ continually representing the slant range to the target. Thus, as illustrated in FIG. 4, values of pull-up slant range $R_p$ corresponding to dive angles $\delta_1$, $\delta_2$, and $\delta_3$, respectively, may be determined graphically merely by extension of each of the three dive paths until they intersect the trajector curve at points $T_1$, $T_2$, and $T_3$. It is apparent from an inspection of FIG. 4 that the altitude and slant range at which pull-up must be initiated increase as dive angle increases. The magnitudes of the various slant ranges $P_1T_1$, $P_2T_2$, and $P_3T_3$ may be determined from FIG. 4 by ordinary trigonometric or geometrical techniques. For example, the pythagorean theorem may be utilized for this purpose merely by reading the ground range and altitude from any given target point such as $P_3T_3$ from FIG. 4. Hence, the slant range $P_3T_3$ may be determined by the following equation $$P_3T_3 = \sqrt{(R_1+R_2)^2 + (A_1+A_2)^2}$$

wherein $R_1$ and $R_2$ represent, without regard to sign, the magnitudes of components of ground range from target $T_3$ to release point L, and from $P_3$ to release point L, respectively, and $A_1$ and $A_2$ represent the altitude components from release point L to $T_3$, and from $P_3$ to release point L, respectively.

Likewise, slant range values can be computed with the aid of simple trigonometry. For example, the slant range $P_3T_3$ may be computed through use of the equations $$P_3T_3 = (R_1+R_2) \sec \delta_3$$

or $$P_3T_3 = (A_1+A_2) \csc \delta_3$$

It should be understood that as many dive angles and slant ranges as may be desired can be determined by using the technique illustrated in FIG. 4.

The values of slant range corresponding to various dive angles, as derived from a graphical construction such as that illustrated in FIG. 4, may comprise rectangular coordinates of points forming the curve of dive angle versus slant range shown in FIG. 5. After the curve of FIG. 5 has been plotted, it is possible to determine the various slant range errors produced by variations in dive angle from a preselected value. Thus, where a dive angle of 10° is preselected, the slant range corresponding to such angle may be read on the vertical axis. Moreover, dive angle errors $\pm\Delta\delta$ of any magnitude also have corresponding slant ranges on the vertical axis. Thus, where $\delta$ varies $\pm 5°$, the slant ranges corresponding to 5° and 15° dive angles, respectively, may be read on the vertical axis, and the difference between these magnitudes and the magnitude of slant range for the preselected dive angle of 10° can be computed easily. In this manner several plus and minus dive angle errors and their corresponding slant range errors may be determined and plotted as a curve representing the variation of $\pm\Delta R_s$ attributable to variations in $\pm\Delta\delta$.

The latter relationship is represented by the curve of FIG. 6. This curve is accurate only for the particular type of aircraft, release velocity V, release angle $\theta$, and type of missile which determine the shape of the trajectory curve of FIG. 4. It should be apparent that other graphical constructions and other empirical data must be used whenever the type of aircraft, release angle, release velocity, or type of object is changed. As suggested hereinbefore, however, the dive-toss delivery tactic is performed in accordance with preselected and precalculated parameters. Hence, it is to be expected that data tables will be provided for operational use which will enable the dive-toss, air-to-ground system of this invention to be preset and precalibrated for tactics involving the use of different aircraft and object types as well as for different dive angles and release velocities. Finally, the aforestated single error-translation equation, (1) $$Y = AX^2 \pm BX$$

is derived from the curve of FIG. 6 through the use of conventional geometrical techniques.

The curve fitting, or error translation, network 320 is designed to produce an electrical output quantity $\pm\Delta R_s$ representative of a slant range error corresponding to a mechanical dive angle error $\pm\Delta\delta$ present on linkage 319. Fundamentally, this network is made up of two resistive circuits, one called a B dial circuit for producing a quantity representative of the BX term and another called an A dial circuit for producing a quantity representative of the $AX^2$ term of the Equation (1). Generally, each of these circuits involves the simultaneous movement by mechanical linkage 319 of potentiometer pickoff arms 332, 338, and 345 from the grounded center-point positions of their respective potentiometer resistors. The reference ground potential present at the center points of the potentiometer resistors represents the preselected dive angle. Accordingly, any movement of mechanical linkage 319 produced by the closed-loop servo system 301 in response to a dive angle error will displace the voltage pickoff arms of the potentiometers and develop thereon potentials representing the magnitude and direction of the error. These potentials are then combined algebraically to produce a slant range error output $\pm\Delta R_s$ which varies with dive angle error $\pm\Delta\delta$, in accordance with the function represented in Equation (1).

The B dial circuit is comprised of a potentiometer 321 having the center point of its resistor 324 coupled to a ground source of constant reference potential, a voltage pickoff arm 332 from which the BX potential is derived coupled mechanically to linkage 319, and two variable-resistance voltage-dropping circuits coupled, respectively, between +250 v. and −250 v. sources of direct-current potential and opposite end terminals of the potentiometer resistor 324 for establishing potential gradients of equal slope and opposite polarity in each of its two halves.

The voltage dropping circuits are comprised of fixed resistors 327 and 328 coupled in series with resistors 326 and 325 of linear potentiometers 322 and 323, respectively. The voltage pickoff arms 329 and 330 of potentiometers 322 and 323 are coupled, respectively, to a terminal common to potentiometer resistors 324 and 326, and a terminal common to potentiometer resistors 324 and 325, thereby adjustably bypassing a portion of resistors 326 and 325, respectively.

The "B" factor in the BX term of Equation (1) may be adjusted by operating the B dial control 32 of the pull-up range computer 9 (FIG. 2), tandem-coupled via mechanical linkage 331 to the voltage pickoff arms 329 and 330 of potentiometers 322 and 323. Thus, movement of B dial control 32 produces equal displacements of the pickoff arms 329 and 330 and, as a result, equal voltage drops. The aforementioned requirement for potential gradients of equal slope and opposite polarity in the two halves of winding 324 of potentiometer 321 makes it necessary that the voltage dropping circuits be balanced. For this reason, fixed resistors 327 and 328 must be equal, potentiometers 322 and 323 must have equal linear characteristics, and pickoff arms 329 and 330 must shunt equal portions of resistors 326 and 325.

The output potential BX of the B dial circuit passes from pickoff arm 332 of potentiometer 321 through fixed resistor 333 to fixed resistor 361 where it combines algebraically with the $AX^2$ potential output of the A dial circuit.

The A dial circuit comprises two linear potentiometers 334 and 335 coupled in cascade between a source of −250 v., direct-current potential and the combining network 360. The center points on the potentiometer resistors 336 and 337 are coupled to ground sources of constant reference potential. The −250 v. source of source of direct-current potential is coupled to each end terminal of potentiometer resistor 336 through resistor 343. Any potential present on pickoff arm 338 is conducted via fixed resistor 339 and potentiometer resistor 340 of potentiometer 341 to a ground source of constant reference potential. The voltage present on the pickoff arm 342 of potentiometer 341 is conducted to each end point of resistor 337 of potentiometer 335. The A dial control 33 is coupled via mechanical linkage 344 to pickoff arm 342. Any potential present on the pickoff arm 345 is proportional to the term $AX^2$ of Equation (1). This potential is then reduced across fixed resistor 346 and added algebraically to the BX potential to the B dial circuit at point 347 to form a resultant quantity representative of the slant range error $\pm\Delta R_s$. The pickoff arms 338 and 345 of potentiometers 334 and 335, respectively, are coupled mechanically to linkage 319 such that any movement of the latter produces displacement in tandem of the two arms. By operating the A dial control 33, it is possible to set the factor "A" of the $AX^2$ term of Equation (1) to the value required for the particular aircraft, ballistic object, and release velocity.

The range error quantity $\pm \Delta R_s$ from the error translating network 320 is combined algebraically with $R_s'$ from the air-to-ground ranging radar 3 (FIG. 2). The quantity $R_s'$ from radar 3 enters the combining network 360 through dropping resistor 362. The range error quantity $\pm \Delta R_s$ combines with signal $R_s'$ at junction terminal 363 which is coupled to a ground source of reference potential through resistor 364. The resultant potential at point 363 is representative continually of the slant range to the target as though measured at the preselected dive angle δ. In other words, $R_s'$ is corrected, thereby nullifying the effect of variations in δ which may occur during the dive.

The corrected slant range potential $R_s'''$ developed at point 363 is compared in pull-up signal generating circuit 370 with a potential of fixed magnitude $R_p''$ representing the precalculated pull-up slant range. The pull-up signal generator circuit 370 is comprised of a switch circuit 371, a high-gain amplifier 372, and a rectifier-integrator circuit 373. Whenever the magnitude of $R_s'''$ at point 363, applied to the cathode of the left hand diode of switch 371 decreases to a magnitude approaching that of $R_p''$ present on its opposite plate, the negative voltage peaks of the 6.3 v., 400-cycle source, appear as negative voltage peaks in the plate circuit. These negative peaks, amplified and inverted by high-gain amplifier 372, are rectified and integrated in the rectifier-intergrator circuit 373 to produce a pull-up signal in the form of a negative-going potential which, in turn, is applied to the control grid of the relay control tube 427, thereby reducing its plate current magnitude to the point where the coil 31 of relay unit 21 effectively is de-energized and the relay contacts change position.

The diode switch circuit 371 comprises dual diode 374 and its associated cathode and plate circuitry. The alternating current voltage from a 6.3 v., 400-cycle source, is divided into two portions which appear, respectively, at the intermediate terminals of voltage dividers comprised of series-connected resistors 375 and 376, and series-connected resistor 377 and potentiometer resistance 378, coupled in parallel between the said source and a ground source of constant potential. The voltage portion developed at the intermediate terminal of the first of the aforementioned voltage dividers passes via coupling condenser 379 to the cathode 380, and the portion developed at the intermediate terminal of the other voltage divider is coupled via condenser 381 to the cathode 382 of dual diode 374. The pickoff arm 383 of potentiometer 384 is coupled to the ground source of constant potential, thereby making it possible to adjust the amplitude of the alternating-current voltage portion present on the cathode 382. For reasons which will become apparent hereinafter, the potentiometer 384 is called the "zero adjust" control. The quantity $R_s'''$ from combining network 360 enters the diode switch circuit 371 between coupling capacitor 379 and cathode 380.

A positive potential for the plates 397 and 394 of dual diode 374 is developed within a voltage divider comprised of resistor 387, potentiometer resistance 388, and potentiometer resistance 389 coupled in series between a +250 v. source of direct-current potential and a ground source of reference potential. The pickoff arm 392 of the slope adjustment potentiometer 393 is coupled to one extremity of potentiometer resistance 388 such that the effective voltage across potentiometer resistance 389 and, hence, the slope of its linear characteristic may be adjusted as required from time to time to conform to the dial markings of the preset range control 27.

The plate potential for dual diode 374, determined by the position of the pickoff arm 390 of the preset range potentiometer 391, is reduced by resistors 395 and 396 to provide a suitable positive potential for plate 394. This potential, in turn, is reduced further by resistor 398 to provide the $R_p''$ potential for plate 397. A storage capacitor 399 is coupled between plate 394 and a ground source of positive potential. The preset range control 27 may be coupled to the pickoff arm 390 of preset range potentiometer 391 by any mechanical or electromechanical linkage 400. The output signal from the switch passes from plate 397 to the control grid of the high gain amplifier 372 via coupling condenser 401.

The negative peaks of the alternating-current voltage portions on cathode 380 appear in plate circuit 397 whenever the corrected slant range potential $R_s'''$ at cathode 380 is reduced sufficiently in magnitude relative to the precalculated and preset slant range potential $R_p''$ at plate 397 to cause plate current conduction. A dual diode 374 is used in this circuit in order to minimize the effects of variations in cathode heater potential and tube aging. This improved result is attributable both to the fact that the 6.3 v., 400-cycle source also constitutes the source of cathode heater potential and to the fact that the bias potentials on the cathode and plate of the right hand diode element of dual diode 374 are established so that negative peaks of the alternating-current voltage portion at cathode 382 are present continually in its plate circuit, thereby producing a negative potential on the upper plate of storage condenser 399. Thus, whenever the cathode heater voltage is reduced, the alternating-current voltage portions present at the cathodes 380 and 382 also are reduced. As a result, less current will flow in the plate circuit 394, and the threshold potential at which the left hand diode will begin to conduct will tend to decrease. However, the fact that less current flows in the circuit of plate 394 means that the potential stored on the upper plate of storage condenser 399 will decrease accordingly, thereby effectively increasing potentials at plates 394 and 397 to the extent required to compensate for the reduction in the output amplitude of the 6.3 v., 400-cycle source. In this manner the conduction threshold potential of the left hand diode is stabilized. Conversely, whenever the amplitude of the 6.3 v., 400-cycle source increases, the current flow into storage condenser 399 will increase and, as a result, the effective potentials on plates 394 and 397 are reduced to the extent required to offset the increased amplitude of the source. Compensation is effected in the same manner whenever aging begins to affect the conductivity of the diodes. Thus, by using a dual diode 374 having associated plate and cathode circuitry such as that described, a switch circuit is obtained wherein the effects of heater voltage fluctuation and tube aging are compensated, thereby eliminating the need for frequent testing and recalibration.

The zero adjust potentiometer 384 makes it possible to increase or reduce the amplitude of the alternating-current voltage portion applied to cathode 382. Inasmuch as this has the effect of increasing or decreasing the average potential on the upper plate of storage condenser 399, this control operates effectively as a fine vernier adjustment of the plate potentials on diode plates 394 and 397, potentials which are established coarsely by the setting of the preset range control 27. For example, the switch circuit 371 will be adjusted properly whenever the preset range control 27 is set to the "zero" range position, measured slant range $R_s'$ and the slant range error quantity $\pm \Delta R_s$ are zero, and the zero adjust potentiometer 384 is set to the position where the relay 21 is actuated.

The high-gain amplifier circuit 372 operates to invert and amplify the peaks of the negative-going half cycles developed in the circuit of diode plate 397. This amplifier is entirely conventional and, for example, may comprise pentode 402 having an unbiased cathode 403, control grid 404 biased to a ground source of constant potential through resistor 405, a suppressor grid 406 coupled to a ground source of constant potential, and a plate 407 and a screen grid 408 coupled via series-connected resistors 409 and 410, and series-connected resistors 411 and 412, respectively, to a source of +250 v. direct-current potential. The potential supply circuits for plate 407 and screen grid 408 are bypassed to ground by condensers 413 and 414, respectively. The comparatively high-amplitude, positive-going voltage peaks produced in the plate circuit of high-gain amplifier 372 pass via coupling condenser 415 to the rectifier-integrator circuit 373.

In general, the rectifier-integrator circuit 373 comprises a diode-connected triode 416 and its associated plate and cathode circuitry. The high-amplitude, positive-going voltage peaks present at the plate 407 of the high-gain amplifier 372 are received at the grid 419 of triode rectifier of the rectifier-integrator circuit where they are translated into a unidirectional, negative-going potential having a magnitude proportional to the amplitude of the positive peaks. This unidirectional potential is smoothed by an integrating network and then applied to the control grid of the relay-control tube 427 to reduce its plate current to a level which effectively de-energizes coil 31 of relay unit 21, thereby actuating contacts A, B, C, and D (FIG. 2).

The triode rectifier 416 of the rectifier-integrator circuit 373 is comprised of plate 417 coupled directly to cathode 418 and grid 419 biased with respect to a ground source of constant potential by resistor 420. The incoming signal from the output of the high-gain amplifier 372, rectified on grid 419, passes to the grid 421 of the relay control tube 427 via the integrating network comprised of series-connected resistor 422 and capacitor 423 coupled between control grid 421 and a ground source of constant potential. The cathode 424 of the relay control tube 427 is biased by cathode resistor 425. The plate 426 is coupled to the +250 v. source of direct-current potential through series-connected resistor 412 and coil 31 of relay unit 21. Thus, the positive-going signals rectified at rectifier 416 produce a pull-up signal in the form of a negative-going unidirectional potential at grid 421 of relay control tube 427, thereby resulting in a substantial reduction in the output current through plate 426.

*Operation of the Pull-Up Range Computer of FIG. 3*

The function of the pull-up range computer represented in FIG. 3 is to compute during the dive portion of a prechosen dive-toss delivery tactic the slant range to target at which a pre-specified pull-up maneuver must be executed in order to effect a successful delivery. In general, the pull-up range computer operates to fulfill this functional requirement by continuously translating a quantity representing any instantaneous error between a measured dive angle and a preselected dive angle into a quantity representative of a corresponding slant range error, combining the slant range error quantity with a quantity continually representing measured slant range to target to produce a slant range quantity corrected for the instantaneous dive angle error, and comparing the corrected slant range quantity with a quantity representing precalculated slant range in order to develop a pull-up signal whenever the two quantities become substantially equal.

Before departing on a mission, values of dive angle $\delta$ and release angle $\theta$ are preselected and the value of pull-up slant range $R_p$, determined by the preselected dive angle and release angle, is precalculated. The preselected values of $\delta$ and $R_p$ are set into the pull-up range computer on dive angle and preset range controls 29 and 27, respectively, and $\theta$ is set into the vertical gyroscopic unit (FIG. 2) on preset release angle control 25. The "A" and "B" factors of the error-translation Equation (1) are set to the values necessary to make it most nearly representative of the true relationship between dive angle errors and resultant slant range errors for the particular type of aircraft and ballistic object to be used in the delivery mission by adjusting the B dial control 32 and the A dial control 33.

The pull-up range computer is operative only during the dive portion OP (FIG. 1) of a dive-toss delivery tactic. During this portion of the tactic, the vertical gyroscopic unit 7 is continuously producing a quantity $\delta'$ representative of the instantaneous dive angle of the delivery aircraft. This quantity enters the pull-up range computer at the input of modulator 302 of the closed-loop servo system 301 wherein it is compared with the electrical quantity representative of preselected dive angle $\delta''$ set in on control 29. The function of the closed-loop servo system 301 is to transduce any instantaneous difference between $\delta'$ and $\delta''$ into a mechanical displacement $\pm\Delta\delta$ representative of the magnitude and direction of dive angle error.

This result is achieved in the closed-loop servo system 301 in a conventional manner. Assume that the preselected dive angle set into the computer on control 29 is 10°. The dive angle control 29 operates through mechanical linkage 318 to position switch arms 316 and 317 to the 10° switch contacts such that resistors 313 and 314 are shunted and the resultant drop in the regulated +14 v. source of direct-current potential is sufficient to make the voltage at the midpoint of potentiometer resistance 312 representative of the preselected 10° dive angle $\delta''$. The modulator 302 receives $\delta'$ and, when the voltage pickoff wiper 307 of potentiometer 308 is at the center of potentiometer resistance 312, an electrical quantity representative of the 10° preselected dive angle $\delta''$ is produced. If it is assumed that $\delta'$ changes from $\delta''$, an electrical position error signal will be developed in modulator 302. This error signal is amplified in servo amplifier 303 and then utilized to energize servo motor 304 which operates through gear train 305 and mechanical linkage 319 to move voltage pickoff arm 307 along potentiometer resistance 312, such that the potential supplied to modulator 302 from potentiometer 308 is maintained substantially equal to $\delta'$. Accordingly, the position of mechanical linkage 319 continuously represents the direction and magnitude of dive angle error $\pm\Delta\delta$, if any.

The mechanical linkage 319 is coupled to voltage pickoff arms 332, 338, and 345 of the error-translating circuit 320 wherein any dive-angle error quantity $\pm\Delta\delta$ represented by mechanical displacement of linkage 319 is translated into an electrical quantity $\pm\Delta R_s$ representing the resultant slant range error. As explained hereinbefore, error-translating circuit 320 functions in accordance with empirically-derived Equation (1), approximating the true functional relationship between $\pm\Delta\delta$ and $\pm\Delta R_s$. It follows, therefore, that when $\pm\Delta\delta$ is zero, the output of the error-translating circuit 320 also should be zero. That such is the case is apparent from the fact that the midpoints of potentiometers 321, 334, and 335 are coupled to a ground source of constant zero-reference potential. When the position of linkage 319 is changed in response to a dive angle error $\pm\Delta\delta$, voltage pickoff arms 332, 338, and 345 are moved in tandem along potentiometer resistors 324, 336, and 337. The motion of the voltage pickoff arm 332 along potentiometer resistor 324 results in the development of a potential representative of the BX term of Equation (1). The rate of change, or slope, of the BX potential with linear motion of voltage pickoff arm 332 may be controlled by operating the B dial control 32 through linkage 331, thereby moving voltage pickoff arms 329 and 330 in tandem along potentiometer resistances 326 and 325 of potentiometers 322 and 323, respectively. The polarity of the linear BX term is determined by the direction of the motion of pickoff arm 332 from the grounded midpoint of resistance 324. Thus, when the arm 332 moves to the right from the midpoint, an increasingly negative BX term is developed as a result of the −250 v. direct-current potential source to which this half of potentiometer resistance 324 is coupled. Conversely, movement of the voltage pickoff arm 332 onto the left hand half of potentiometer resistance 324 develops a BX term having a positive polarity produced by the +250 v. direct-current potential source to which this half is coupled.

A potential representing the $AX^2$ term of error-translation Equation (1) is developed in the A dial circuit whenever voltage pickoff arms 338 and 345 are displaced from the grounded midpoints of potentiometer resistances 336 and 337, respectively. Inasmuch as the extremities of potentiometer resistances 336 and 337 are coupled to a source of −250 v. direct-current potential through resistor 343, the polarity of the $AX^2$ term always will be negative, notwithstanding the displacement of voltage pickoff arms 338 and 345. Potentiometers 334 and 335 of the A dial circuit are coupled in cascade via resistor 339 and potentiometer 341. The magnitude of the A factor of the $AX^2$ term can be adjusted by varying the position of the voltage pickoff arm 342 of potentiometer 341. The electrical quantities representing the BX and the $AX^2$ terms of Equation (1) are combined algebraically at point 347 to form a composite electrical quantity $\pm \Delta R_s$ approximating the true slant range error, if any.

The resultant quantity $\pm \Delta R_s$ passes through resistor 361 to point 363 of combining network 360 where it adds algebraically to $R_s'$ from radar 3 (FIG. 2). The resultant composite slant range quantity $R_s'''$ developed at point 363 passes directly to the cathode 380 of the switch circuit 371 of pull-up signal generator circuit 370.

The function of the pull-up signal generator 370 is to compare the corrected slant range quantity $R_s'''$ with the precalculated pull-up slant range quantity $R_p''$ and produce a pull-up output signal when the former is reduced during the progress of the dive toward the target to the point where it is substantially equal in magnitude to the latter. This functional requirement is fulfilled through the use of a switch circuit 371 which is closed effectively whenever the aforesaid substantial equality of $R_p'''$ and $R_s''$ occurs, such that the negative peak portions from a 6.3 v., 400-cycle source pass therethrough. The high-gain amplifier 372 inverts and amplifies the negative peak portions passed by switch circuit 371, and a rectifier-integrator circuit 373 translates the amplified positive peaks from the output of high-gain amplifier 372 into a negative-going plate-current cutoff potential for the grid of relay control tube 427, thereby effectively de-energizing coil 31 and causing the pull-up signal unit 15 (FIG. 2) to indicate perceptibly the instant of arrival at pull-up point P (FIG. 1).

Inasmuch as the switching element of switch circuit 371 comprises the left hand diode section of dual diode 374, the switch closes when the potential of cathode 380 is reduced sufficiently in magnitude relative to the potention on diode plate 394 to enable the conduction therethrough of the negative peak portions derived from the 6.3 v., 400-cycle source and applied to cathode 380 via resistor 376 and capacitor 379. As the delivery aircraft approaches the target, the magnitude of $R_s'$ and, hence, $R_s'''$ decreases. Accordingly, the bias potential on cathode 380 becomes less positive, finally resulting in the conduction of portions of the negative half cycles of the alternating-currents voltage to plate 397. The potential applied to diode plate 397, established by adjusting preset range control 27, represents the precalculated value of pull-up slant range $R_p''$ at which predetermined pull-up maneuver is to begin. The movement of preset range control 27 operates through linkage 400 to displace the voltage-pickoff arm 390 of potentiometer 391. The resistance 389 of this potentiometer is an element of a voltage divider which also comprises resistor 387 and potentiometer resistance 388 coupled in the order named between a source of +250 v. direct-current potential and the upper extremity of potentiometer resistance 389. The lower extremity of potentiometer resistance 389 is coupled to a ground source of constant potential. The potential developed on voltage pickoff arm 390 then drops across resistors 395, 396, and 398 to the magnitude of the precalculated pull-up slant range potential $R_p''$ required for diode plate 397.

The voltage pickoff arm 392 of the slope adjustment potentiometer 393 is coupled to one extremity of its resistance 388, thereby making it possible to establish the potential gradient in resistance 389 of potentiometer 391 as may be required to cause the voltage drop at each point thereon to be proportional to values of precalculated pull-up range $R_p''$ set in on preset range control 27. The slope adjustment potentiometer 393 normally will be set during a calibration procedure performed as may be necessary before a delivery tactic is undertaken.

In the switch circuit 371, the right hand diode element of dual-diode 374, coupled in parallel with the left hand diode section and storage capacitor 399, automatically translates variations in the amplitude of the 6.3 v., 400-cycle source into inverse changes in the magnitude of the direct-current potential $R_p''$ applied to diode plate 397, large enough to offset any tendency of the effective direct-current potential difference required to close the diode switch to change. This function of the right hand diode section of dual-diode 374 also compensates for fluctuations in potential difference caused by tube aging.

To fulfill the aforestated functional requirement, a portion of the 6.3 v., 400-cycle voltage is applied to the cathode 382 of the right hand diode section via resistor 377 and capacitor 381. The bias potential for cathode 382 may be adjusted by a zero-adjust potentiometer 384 which has a variable portion of its resistance 378 shunted by a conductive path between voltage pick-off arm 383 and a ground source of constant potential. Inasmuch as the right hand element of dual-diode 374 normally conducts at least a portion of the negative half cycles derived from the 6.3 v., 400-cycle source, a negative charge is developed on the upper plate of storage capacitor 399, thereby effectively reducing the positive potential applied to diode plate 394. The extent to which the charge on storage capacitor 399 affects the potentiol on plate 394 and, hence, that on diode plate 397, is determined by the amplitude of the negative half cycles conducted through the right hand diode section. Thus, increasing amplitude of the negative half cycles results in a decrease in the potential applied to diode plate 397, thereby offsetting the tendency for the switch to close at a slant range to target greater than that of the precalculated pull-up range $R_p$ set into the computer on control 27. Conversely, a reduction in the amplitude of the negative half cycles results in a diminution in the charge on the upper plate of storage capacitor 399, thereby effectively increasing the positive potential applied to diode plate 397 and preventing the left hand diode switch section from closing at a slant range less than $R_p$.

The voltage pickoff arm 383 of the zero-adjust potentiometer 384 is set so that the pull-up signal generator 370 produces a pull-up signal output whenever the precalculated pull-up slant range $R_p$ is set at zero on preset range control 27 and the measured range $R_s'$ and range error $\pm \Delta R_s$ input quantities are zero. It is necessary to adjust the zero-adjust potentiometer 384 only when operating results or test procedures disclose that calibration is required.

Upon arrival at the computed pull-up slant range, the switch circuit 371 closes and negative peak portions derived from the 6.3 v., 400-cycle source begin to appear at plate 397. These unidirectional potential fluctuations pass to the control grid 404 of high-gain amplifier 372 via coupling capacitor. This amplifier functions in a well-known and conventional manner to amplify and invert the polarity of the potential fluctuations applied to control grid 404.

The diode-connected triode 416 of rectifier-integrator circuit 373 receives the positive-going voltage peaks present on the plate 407 of high-gain amplifier 372 on the control grid 419. The rectifier 416, having its plate 417 and its cathode 418 coupled to a ground source of constant potential and its control grid 419 biased above ground by resistor 420, constitutes a rectifier wherein portions of the output signal received from high-gain amplifier 372 in excess of the bias potential developed across resistor 420 remain on control grid 419. These positive-going output signal portions are integrated in a resistance-capacitance network comprised of resistor 422 and capacitor 423, and the resulting unidirectional negative potential is applied to the control grid 421 of relay control tube 427, rapidly reducing the plate current therethrough to a point which effectively de-energizes coil 31 of relay unit 21. The de-energization of coil 31 causes relay contact D (FIG. 2) to close, thereby actuating the pull-up signal unit 15 from power source E.

From the foregoing description, it should be apparent that the subject invention provides a highly effective dive-toss air-to-ground delivery system including a novel pull-up range computer which eliminates the necessity for monitoring dive angle closely during a dive along a predetermined path intersecting the target. Although the pull-up range computer of FIG. 3 has circuitry which effectively corrects the slant range quantity $R_s'$, measured by the air-to-ground range radar 3 (FIG. 2) to eliminate the effect of instantaneous errors in dive angle δ, it should be understood that the slant range error quantity $\pm\Delta R_s$ may be utilized to correct the precalculated slant range quantity $R_p''$ developed at potentiometer 391 instead.

The details set forth in the foregoing description and represented in the accompanying drawings are intended merely to facilitate the practice of the invention by persons skilled in the art. The scope of the invention is delineated in the following claims.

We claim:

1. In an analog computer for compensating a dependent linear quantity to offset the effect of errors in an independent angular quantity, a generator for producing a signal whenever the said compensated linear quantity diminishes to a magnitude substantially equal to a predetermined linear quantity, the said signal generator comprising: a source of a compensated linear quantity; a source of a linear quantity of predetermined magnitude; an electronic switch; means coupling each of the aforesaid sources to the said electronic switch; a source of alternating-current voltage; means coupling the said source of alternating-current voltage to the said electronic switch; means coupled to the said source of alternating-current voltage and to the said source of predetermined magnitude linear quantity responsive to variations in the amplitude of the said alternating-current voltage to produce a unidirectional potential for compensating the said linear quantity of predetermined magnitude to the extent required to offset the effect of the said amplitude fluctuations on the operation of the said electronic switch; and means coupled to the said electronic switch for translating portions of alternating-current voltage passed by the said switch into a signal in the form of a substantially-continuous, negative-going unidirectional potential.

2. In an analog computer for compensating a dependent linear quantity to offset the effect of errors in an independent angular quantity, a generator for producing a signal when a first potential representing the said compensated linear quantity diminishes to a magnitude substantially equal to that of a second potential having the same polarity as the said first potential and representing a quantity having a predetermined constant magnitude, the said generator comprising: a unidirectionally-conductive device having input and output terminals; a source of alternating-current voltage; means coupling the said source to the said input terminal; means for applying the said first potential to the said input terminal and the said second potential to the said output terminal such that the said device conducts at least a portion of the negative half cycles of the said alternating-current voltage when the magnitude of the said first potential becomes substantially equal to that of the said second potential; an electrical charge-storage element; another unidirectionally-conductive device having input and output terminals; means coupling the output terminal of the said another device to the said storage element; means coupling the input terminal of the said another device to the said source; means coupling the charge-storage element to the output terminal of the said device; a high-gain amplifier; means coupling the output terminal of the said device to the said high-gain amplifier; a rectifier; means coupling the said high-gain amplifier to the said rectifier; and an integrating network coupled to the said rectifier for developing a signal in the form of a substantially-continuous, negative-going, unidirectional potential.

3. A generator for producing an output signal when a first unidirectional potential diminishes to a magnitude substantially equal to that of a second unidirectional potential of constant magnitude, the said generator comprising: a source of alternating-current voltage; a unidirectionally-conductive device having input and output terminals; means coupling the said source to the said input terminal; means for applying the said first potential to the said input terminal and means for applying the said second unidirectional potential to the said output terminal such that the said device becomes conductive during at least a portion of the negative half cycles of the said alternating-current voltage when the magnitude of the said first potential becomes substantially equal to that of the said second potential; an electrical charge-storage element coupled in series with another unidirectionally-conductive device between the said source and a ground source of constant potential such that fluctuations in the amplitude of the said alternating-current voltage produces corresponding changes in the magnitude of the charge accumulated by the said storage element; means coupling the said storage element to the output terminal of the said device such that the potential applied to the said output terminal changes in the direction and to the extent required to nullify the effect of the said amplitude fluctuations; and means coupled to the output terminal of the said device for converting the conducted portions of the said alternating-current voltage into a signal in the form of a negative-going unidirectional potential.

4. A generator for producing an output signal when a first unidirectional potential diminishes to a magnitude substantially equal to that of a second unidirectional potential having a constant magnitude and the same polarity as that of the said first potential, the said generator comprising: an electronic switch having input and output terminals; a source of alternating-current voltage; means coupling the said source to the aforesaid input terminal; means for applying the aforesaid first potential to the said input terminal; means for applying the said second potential to the said output terminal; a diode and an electrical charge-storage element coupled in series between the said alternating-current voltage source and a ground source of constant potential; means coupling the said storage element to the said output terminal; an amplifier; means coupling the said amplifier to the said output terminal; a rectifier; means coupling the said rectifier to the said amplifier; an integrating network; means coupling the said rectifier to the said integrating network; and means for deriving from the said intergrating network a signal in the form of a unidirectional potential.

5. A dive-toss air-to-ground delivery system for facilitating the delivery of an object to a destination in accordance with a prechosen dive-toss delivery tactic, the said system comprising: an object to be delivered; a release mechanism; means coupling the said object to the said release mechanism; first, second, third, and fourth means for producing independent electrical quantities representing instantaneous slant-range to the target, instantaneous pitch attitude of the delivery aircraft on a first output thereof, yaw and roll attitudes, and curvilinear acceleration, respectively, the said second means including means producing an electrical signal on a second output thereof for actuating the said release mechanism upon the occurrence of a preselected release angle during a pull-up maneuver; means coupling said second output of the last-mentioned means to the said release mechanism; a pull-up range computer responsive to the said instantaneous slant-range and to the first output of said pitch attitude electrical quantities for generating a pull-up electrical signal at the instant a predetermined pull-up maneuver is to begin; means for developing perceptible flight-path-error indications; means passing the roll-attitude electrical quantity from the said third means to the said flight-path-error indicator; means for producing a perceptible indication of the instant when the predetermined pull-up maneuver is to begin; and means responsive to the said pull-up electrical signal for energizing the said pull-up indicating means and for rendering the aforesaid flight-path-error-indicating means unresponsive to the aforesaid pitch attitude electrical quantity through said second output from the said second means, and responsive to the said acceleration and yaw electrical quantities, respectively, such that the said flight-path-error-indicating means registers only the errors in roll and pitch during the dive portion and only the errors in yaw, roll and acceleration during the pull-up portion of the aforesaid dive-toss delivery tactic.

6. A dive-toss air-to-ground delivery system facilitating the execution of a dive-toss delivery tactic comprising: means generating an electrical quantity representing the measured slant-range to a target; means generating an electrical quantity representing the attitude of the aircraft measured around the pitch axis on a first output and an electrical signal on a second output providing an object release signal; means responsive to the said pitch electrical quantity on the first output thereof and the slant-range electrical quantity to compute the pull-up slant-range at which a predetermined pull-up maneuver is to be executed, the said computing means including means generating a pull-up electrical signal at the instant of arrival at the computed pull-up point; means producing electrical quantities representing the attitude of the aircraft measured around the yaw and roll axes, respectively; means producing an electrical quantity representative of the magnitude of curvilinear accelerative force; means responsive to the said pull-up electrical signal to indicate perceptibly the instant of arrival at the computed pull-up point; means responsive to said first output of said pitch-attitude and roll-attitude electrical quantities to indicate the instantaneous attitude of the said aircraft with respect to the pitch and roll axes; means responsive to the said pull-up electrical signal to cause the last-mentioned indicator means to become unresponsive to the said pitch attitude electrical quantity and responsive to the said curvilinear accelerative-force, yaw, and roll electrical quantities, such that the said last-mentioned indicator means indicates composite yaw and roll attitudes and the accelerative force during the said pull-up maneuver; and means responsive to the second output of said pitch-attitude electrical generating means to release an object to be delivered at a predetermined release angle.

7. A dive-toss air-to-ground delivery system facilitating the delivery of an object from an aircraft to a target in accordance with preselected and precalculated parameters of a dive-toss tactic whereby the said aircraft dives at a prespecified velocity and with error limits of preselected dive-angle along a line intersecting the target until reaching a position where the slant-range to the target is such that the object to be delivered may be tossed to the target by releasing the said object at a preselected release angle while executing a pull-up maneuver having a prespecified radial component of curvilinear acceleration, the said system comprising: a mechanism for releasing an object to be delivered; first means continually measuring and producing an output voltage quantity representing the instantaneous slant-range to the target; second means continuously measuring and producing a voltage quantity representing the instantaneous pitch angle on a first output thereof, the said second means including means producing an object release signal over a second output thereof for actuating the said release mechanism upon the occurrence of the said preselected release angle; means coupling the said release mechanism to the last-mentioned means; third means responsive to the said first means and second means through the first output thereof to produce a pull-up voltage signal when the aircraft arrives at the position where the said pull-up maneuver should begin; fourth means to produce a perceptible indication signifying arrival at the said pull-up point; fifth means producing an output voltage quantity representing accelerative force; sixth means having first and second output terminals and including means to produce at the said first output terminal voltage quantity representing a rotation around the yaw axis and at the said second output terminal a voltage quantity representing rotation around the roll axis; seventh means to indicate perceptibly any deviation of the delivery aircraft from the flight path established by the preselected and precalculated parameters of the tactic; eighth means coupling the second output terminal of the said sixth means to the said seventh means; ninth means coupling the said second and seventh means; and means responsive to the said pull-up voltage signal to decouple the first output of said second means and the seventh means, to actuate the said fourth means, and to render the said seventh means responsive to the acceleration-representative voltage quantity produced by the said fifth means and the yaw-representative voltage quantity produced by the said sixth means.

8. A dive-toss air-to-ground delivery system as represented in claim 7 wherein the said third means for producing a pull-up signal when the aircraft arrives at the position where the said pull-up maneuver should begin is a pull-up range computer comprising: means generating a voltage quantity representative of a precalculated dive-angle; means responsive to the pitch attitude voltage quantity through the first output from the said second means and the precalculated dive-angle voltage quantity for producing a dive-angle error voltage quantity; means coupled to the said dive-angle error voltage producing means for translating the said dive-angle-error voltage quantity into a slant-range error voltage quantity; means coupled to the said first means and the last-mentioned means for combining algebraically the instantaneous slant-range voltage quantity of said first means and the slant-range error voltage quantity to produce a corrected slant range voltage quantity; means generating a voltage quantity representative of a precalculated pull-up slant-range voltage quantity; and means responsive to the aforesaid corrected slant-range voltage quantity and said precalculated pull-up slant-range voltage quantity for generating a pull-up voltage signal when the corrected slant-range voltage quantity becomes substantially equal to the precalculated pull-up slant-range voltage quantity.

9. A dive-toss air-to-ground delivery system as represented in claim 8 wherein the said pull-up signal generating means comprises: a source of alternating-current voltages; means coupled to said source and responsive to the said corrected and precalculated slant-range voltage quantities for conducting at least portions of the negative half cycles of the said alternating-current voltage when the aforesaid slant-range voltage quantities become substantially equal; and means coupled to the said conducting means for translating the said portions into a unidirectional pull-up signal.

10. A dive-toss air-to-ground delivery system for facilitating the delivery of an object from an aircraft to a destination in accordance with preselected and precalculated parameters of a dive-toss tactic whereby the said aircraft dives at a prespecified velocity and within error limits of a preselected dive-angle along a line intersecting the destination until reaching a position where the slant-range to the destination is such that the object to be delivered may be tossed thereto by effecting its release at a preselected release angle while executing a pull-up maneuver having a prespecified radial component of curvilinear acceleration, the said system comprising: an object to be delivered; a release mechanism; means coupling the said object to the said release mechanism; an echo ranging device continually measuring and producing a voltage quantity representing actual slant-range; means including a vertically-oriented, stable element for measuring and producing a voltage quantity on a first output thereof representing actual pitch attitude, the last-mentioned means also including means on a second ouput thereof providing an object release signal for actuating the said release mechanism upon the occurrence of the aforesaid preselected release angle; means coupling the said release mechanism to the said actuating means; means including a stable element having an axis lying in a horizontal plane and perpendicular to the instantaneous flight path of the aircraft for measuring and producing voltage quantities representative of yaw and roll attitudes, respectively; means including a resiliently-supported seismic mass linearly displaceable along a line coinciding with the radial component of curvilinear acceleration for measuring and producing a voltage quantity representing the magnitude of the said component; a pull-up range computer responsive to the aforesaid actual slant-range and actual pitch attitude first output voltage quantities for producing a pull-up voltage signal at the instant of arrival at the slant-range where pull-up should begin; means responsive to the said pull-up voltage signal for producing a perceptible indication of the instant pull-up is to begin; means continuously responsive to the aforesaid roll-attitude voltage quantity for perceptibly registering flight-path-errors; and means coupled to the pull-up range computer for selectively rendering the flight-path-error registering means responsive to the said actual pitch attitude first output voltage quantity and roll attitude voltage quantity during the dive portion and to the said yaw-attitude and acceleration quantities during the pull-up portion of the dive-toss delivery tactic.

11. A dive-toss air-to-ground delivery system as represented in claim 10 wherein the said pull-up range computer comprises: means developing a voltage quantity representing a precalculated dive-angle; means responsive to the said first output actual pitch attitude and precalculated dive-angle voltage quantities for producing a dive-angle error voltage quantity; means coupled to the dive-angle error voltage quantity-producing means for translating dive-angle error voltage into a slant-range error voltage quantity; means coupled to the said first means and the last-mentioned means for combining algebraically the said actual slant-range and slant-error voltage quantities to produce a corrected slant-range voltage quantity; means generating a precalculated pull-up slant-range voltage quantity; and means responsive to the aforesaid corrected slant-range voltage and precalculated slant-range voltage quantities for generating a pull-up signal when corrected slant-range voltage becomes substantially equal to said precalculated slant-range voltage.

12. A dive-toss air-to-ground delivery system facilitating the delivery of an object from an aircraft to a destination in accordance with preselected and precalculated parameters of a prechosen dive-toss tactic whereby the said aircraft dives at a prespecified velocity and within error limits of a preselected dive-angle along a line intersecting the destination until reaching a position where the slant-range to the destination is such that the object to be delivered may be tossed thereto by effecting its release at a preselected release angle voltage while executing a pull-up maneuver having a prespecified radial component of curvilinear acceleration, the said system comprising: an air-to-ground ranging radar for continually measuring and producing a voltage quantity representing the instantaneous slant-range to the destination; a vertical gyroscopic unit for continuously measuring and producing a first voltage quantity representing the instantaneous pitch attitude of the delivery aircraft and a second voltage signal produced for object release; a yaw-roll gyroscopic unit for measuring and producing voltage quantities representing, respectively, the instantaneous yaw and roll attitudes of the delivery aircraft; an accelerometer for measuring and producing a voltage quantity representing the radial component of curvilinear acceleration during the aforesaid pull-up maneuver; a pull-up range computer coupled to the said radar and vertical gyroscopic unit and responsive to the said instantaneous slant-range and instantaneous pitch attitude first voltage quantities for computing and producing a pull-up voltage signal at the instant the delivery aircraft arrives at a position where the pull-up maneuver should begin; means coupled to the said pull-up range computer and responsive to the said pull-up voltage signal for producing a perceptible indication of the instant pull-up is to begin; means for perceptibly registering flight-path-errors; means passing the said roll attitude voltage quantity from the said yaw-roll gyroscopic unit into the said flight-path-error indicator; means coupled to the pull-up range computer and responsive to the said pull-up voltage signal for selectively rendering the flight-path-registering means responsive to the said instantaneous pitch attitude first voltage quantity and to the roll attitude voltage quantity during the dive portion and to the said yaw-attitude and acceleration voltage quantities during the pull-up portion of the dive-toss delivery tactic; an object to be delivered; a release mechanism; means coupling the said object to the said release mechanism; and means coupling the said release mechanism to the second voltage signal of said vertical gyroscopic unit such that release may be effected when the said instantaneous pitch attitude second voltage quantity becomes equal to a preselected release angle voltage.

13. A dive-toss air-to-ground delivery system as represented in claim 12 wherein the said pull-up range computer comprises: means for generating a voltage quantity representing a preselected dive-angle; means coupled to the said vertical gyroscopic unit first voltage quantity and to the said preselected dive-angle voltage quantity generating means for generating a dive-angle error voltage quantity in response to the said instantaneous pitch attitude first voltage and preselected dive-angle voltage quantities; means coupled to the said dive-angle error voltage generating means for translating the quantity into a voltage quantity representing slant-range error; means coupled to the said radar and translating means for combining algebraically the said instantaneous slant-range voltage and slant-range error voltage quantities to produce a corrected slant-range quantity; means for generating a voltage quantity representing a precalculated pull-up slant-range; and means responsive to the aforesaid corrected slant-range and precalculated pull-up slant-range voltage quantities for generating a pull-up voltage signal when the said last two-named quantities become substantially equal.

14. A dive-toss air-to-ground delivery system for facilitating the delivery of an object from an aircraft to a target in accordance with a prechosen dive-toss tactic having fixed parameters whereby the said aircraft dives at a preselected velocity and within error limits of a preselected dive-angle along a flight-path intersecting the target until reaching a position where the slant-range to the target is equal to a precalculated slant range from which the said delivery may be effected by releasing the object at a preselected release angle while executing a pull-up maneuver having a prespecified radial component of curvilinear acceleration, the said system comprising: an air-to-ground monopulse radar system for producing continually a voltage quantity representing slant range to target measured at sharply oblique angles to a radiant energy reflecting surface; a vertical gyroscopic unit including a vertically-oriented, stable element for measuring and producing a first voltage quantity representing the instantaneous pitch attitude of the delivery aircraft and a second voltage object releasing signal; a yaw-roll gyroscopic unit including a stable element having an axis of rotation lying in a horizontal plane and perpendicular to the predetermined flight-path for continuously producing voltage quantities representing, respectively, the yaw and roll attitudes of the delivery aircraft; an accelerometer including a resiliently-supported seismic mass displaceable linearly along a line coincident with the radial component of curvilinear acceleration for producing a voltage quantity representing the magnitude of the said component; a pull-up range computer coupled to the aforesaid monopulse radar and the first voltage quantity of said vertical gyroscopic unit; a pull-up signal unit; a flight-path-error indicator; means passing the roll attitude voltage quantity from the said yaw-roll gyroscopic unit to the said flight-path-error indicator; means coupled to the pull-up range computer for actuating the said pull-up signal unit and rendering the flight-path-error indicator selectively responsive to the said instantaneous pitch attitude first voltage quantity and said roll attitude voltage quantity during the dive portion and the said acceleration and yaw voltage quantities during the pull-up portion of the dive-toss delivery tactic; an object to be delivered; a release mechanism; means coupling the said object to the said release mechanism; and means coupling the said mechanism to the second voltage objective releasing signal of said vertical gyroscopic unit for releasing the said object when the instantaneous pitch attitude voltage quantity becomes equal to a preset voltage representing the preselected release angle.

15. A dive-toss air-to-ground delivery system as represented in claim 14 wherein the said pull-up range computer comprises: means coupled to the first voltage quantity of said vertical gyroscopic unit for developing a voltage quantity representing the direction and magnitude of any deviation from a preselected dive-angle voltage quantity; means coupled to the said developing means for translating the said deviation voltage quantity into a voltage quantity representing an error in slant-range attributable to the aforesaid dive-angle deviations; means coupled to the said air-to-ground monopulse radar and to the said translating means for producing a corrected voltage quantity representing slant-range as if measured at the preselected dive-angle voltage quantity; and means coupled to the said corrected slant-range voltage quantity producing means for generating a pull-up voltage signal whenever the said corrected slant-range voltage quantity becomes substantially equal to a precalculated slant-range voltage quantity.

16. A dive-toss air-to-ground delivery system for facilitating the delivery of an object to a destination in accordance with a prechosen dive-toss delivery tactic, the said system comprising: an object to be delivered; a release mechanism; means coupling the said object to the said release mechanism; an echo-ranging unit for measuring and producing continually a voltage quantity representing the instantaneous slant-range to the destination; means including a vertically-oriented, stable element for measuring and producing continuously a first voltage quantity representing the instantaneous pitch attitude of the delivery aircraft, the said vertically-oriented, stable element also including means to produce a second voltage signal quantity for actuating the said release mechanism whenever the instantaneous pitch attitude first voltage quantity becomes equal to a voltage representing a predetermined release angle; means coupling said second voltage signal quantity of said vertically-oriented, stable element to the said release mechanism; means including a stable element having an axis of rotation lying in a horizontal plane and perpendicular to the predetermined flight-path of the chosen tactic for measuring and producing continuously two voltage quantities representing, respectively, the yaw and roll attitudes of the delivery aircraft; an accelerometer for producing a voltage quantity representing the radial component of the curvilinear acceleration during a predetermined pull-up maneuver; a pull-up range computer coupled to the aforesaid echo-ranging unit and the instantaneous pitch attitude first voltage quantity producing means for producing a pull-up voltage signal at the instant the delivery aircraft arrives at a position where the predetermined pull-up maneuver should begin, the said pull-up range computer including means responsive to the said instantaneous pitch attitude first voltage quantity for generating a voltage quantity representing any deviation of the dive-angle of the delivery aircraft from a preselected dive-angle, means coupled to the said deviation dive-angle voltage quantity generating means for translating the last-mentioned voltage quantity into a slant-range error voltage quantity; means coupled to the aforesaid translating means for combining algebraically the instantaneous slant-range voltage and slant-range error voltage quantities to produce a corrected slant-range voltage quantity representing the slant-range to the destination as though measured at the voltage representing the preselected dive-angle, and means coupled to the said combining means for generating a pull-up voltage signal when the corrected slant-range voltage quantity becomes substantially equal to a precalculated slant-range voltage quantity at which pull-up should be initiated; means responsive to the said pull-up voltage signal for producing a perceptible indication of the instant pull-up is to be initiated; means continuously responsive to the said roll voltage quantity for developing perceptible flight-path-error indications; and means coupled to the said pull-up range computer and responsive to the said pull-up voltage signal for rendering the said flight-path-error-indicating means selectively responsive to the instantaneous pitch attitude first voltage quantity during the dive and to the yaw and acceleration voltage quantities during the pull-up portion of the dive-toss delivery tactic.

17. A dive-toss air-to-ground delivery system for facilitating the delivery of an object from an aircraft to a target in accordance with the preselected and precalculated parameters of a prechosen dive-toss tactic whereby the said aircraft dives at a prespecified velocity within error limits of a preselected angle along a line intersecting the target until arriving at a position where the slant-range to the target is such that the object may be tossed thereto by effecting its release at a preselected release angle while executing a pull-up maneuver having a prespecified radial component of curvilinear acceleration, the said system comprising: an object to be delivered to the target; a release mechanism; means coupling the said object to the said release mechanism; an air-to-ground ranging radar for measuring and producing continually a voltage quantity representing the instantaneous slant-range between the aircraft and the target; a vertical gyroscopic unit including a vertically-oriented, stable element for measuring and producing continuously a first voltage quantity representing the instantaneous pitch attitude of the delivery aircraft, the said vertical gyroscopic unit including means to produce a second voltage quantity for actuating the said release mechanism when the said instantaneous pitch attitude first voltage quantity becomes substantially equal to a voltage representing the said preselected release angle; means coupling the said vertical gyroscopic unit second voltage quantity actuating means to the said release mechanism; an accelerometer including a resiliently-supported seismic mass displaceable linearly in the direction of the instantaneous radial component of curvilinear acceleration for measuring and producing a voltage quantity representing the magnitude of the said component during the said pull-up maneuver; a pull-up range computer coupled to the aforesaid air-to-ground ranging radar and to the first voltage quantity of said vertical gyroscopic unit for utilizing the said instantaneous slant-range voltage and instantaneous pitch attitude first voltage quantities to compute the slant-range at which the predetermined pull-up maneuver should be initiated, the said pull-up range computer including a first voltage divider network coupled across a first constant magnitude source of unidirectional potential for generating a voltage quantity representing the preselected dive-angle voltage quantity, a closed-loop servo system coupled to the said vertical gyroscopic unit and responsive to the said instantaneous pitch attitude voltage and preselected dive-angle voltage quantities to produce a voltage quantity representing the magnitude and direction of any instantaneous deviation of the pitch attitude of the delivery aircraft from the preselected dive-angle, an error-translating network coupled to the closed-loop servo system for translating the said instantaneous deviation pitch attitude voltage quantity into a voltage quantity representing the direction and magnitude of any error in slant-range attributable to dive-angle errors, an algebraic adding network coupled to the said air-to-ground ranging radar and to the said error translating network for combining the said instantaneous slant-range voltage and slant-range error voltage quantities to produce a corrected slant-range voltage quantity representing slant-range as though measured at the said preselected dive-angle, a second voltage divider network coupled across a second constant magnitude source of unidirectional potential for producing a voltage quantity representing a precalculated slant-range, and a pull-up signal generator responsive to the aforesaid corrected slant range voltage and precalculated slant-range voltage quantities for generating a pull-up voltage signal when the first of the two last-named quantities becomes substantially equal to the last; a pull-up signal unit for producing a perceptible indication of the instant when the predetermined pull-up maneuver should be initiated; means responsive to the said pull-up voltage signal for energizing the said pull-up signal unit; a flight-path error indicator for developing perceptible indications of flight path errors; a yaw-roll gyroscope unit including a stable element having an axis of rotation lying in a horizontal plane and perpendicular to the predetermined flight-path for continuously producing voltage quantities representing, respectively, the yaw and roll attitudes of the delivery aircraft; means continuously passing the said roll voltage quantity from said yaw-roll gyroscopic unit to the said flight-path-error indicator; and means responsive to the said pull-up voltage signal for rendering the said flight-path-error indicator selectively responsive to the said instantaneous pitch attitude first voltage quantity during the dive portion and to the said yaw and acceleration voltage quantities during the pull-up portion of the dive-toss delivery tactic.

18. In a system wherein the error in an instantaneous linear quantity varies as the function of the error in an instantaneous angular quantity, an analog computer for compensating the said linear quantity for the effect of errors in the said angular quantity and producing a signal whenever the compensated linear quantity becomes substantially equal to a linear quantity of predetermined constant magnitude, the said computer comprising: a first voltage divider network coupled across a first source of constant-magnitude, unidirectional potential for developing an electrical quantity representing the correct value of a pitch angular electrical quantity; a closed-loop servo system coupled to the said first voltage divider network and responsive to the correct pitch angular electrical quantity and an instantaneous linear electrical quantity for producing an electrical pitch angular quantity representing the direction and magnitude of any departure of the said instantaneous pitch angular electrical quantity from the correct pitch angular electrical quantity; a curve fitting network operating upon the departure pitch angular electrical quantity and empirically-derived constants to translate the departure pitch angular electrical quantity and empirically-derived constants into an electrical slant-range quantity approximating the direction and magnitude of error in the instantaneous linear pitch angular electrical quantity attributable to the departure pitch angular electrical quantity; an alegbraic adding network coupled to the aforesaid curve fitting network for combining the error slant-range electrical quantity and the aforesaid instantaneous linear pitch angular electrical quantity to produce a compensated linear slant-range electrical quantity; a second voltage divider network coupled across a second source of constant-magnitude, unidirectional potential for developing an electrical slant-range quantity representing the said linear electrical quantity of predetermined constant magnitude; an alternating-current voltage source; an electronic switch coupled to the said alternating-current voltage source, the said second voltage divider network, and the said algebraic adding network, the said switch being operative to pass at least portions of the negative half-cycles of the said alternating-current voltage when the compensated linear slant-range electrical quantity becomes substantially equal to the electrical linear slant-range electrical quantity of constant magnitude; an electrical charge storage device having a unidirectional input device coupled in series between the said source of alternating-current voltage and a ground source of constant potential; means coupling the storage element of the said storage device to the said second voltage divider network and to the said electronic switch such that the magnitude of the electrical linear voltage quantity of constant magnitude is modified to an extent sufficient to compensate for any changes in the amplitude of the said alternating-current voltage; means coupled to the said electronic switch for amplifying the said alternating-current voltage portions; means coupled to the said amplifying means for rectifying the said alternating-current voltage portions; and means coupled to the said rectifying means for integrating the said rectified voltage portions to produce a signal in the form of a substantially-continuous, negative-going unidirectional potential.

References Cited in the file of this patent
UNITED STATES PATENTS

| | | |
|---|---|---|
| 2,480,208 | Alvarez | Aug. 30, 1949 |
| 2,609,729 | Wilkenson et al. | Sept. 9, 1952 |
| 2,712,269 | Barbarini et al. | July 5, 1955 |
| 2,736,878 | Boyle | Feb. 28, 1956 |
| 2,758,511 | McLean et al. | Aug. 14, 1956 |
| 2,805,601 | Marton | Sept. 10, 1957 |